Sept. 29, 1959          P. P. RICHARD          2,906,356
ARRANGEMENT FOR THE AUTOMATIC STEERING OF
TRACTORS OR THE LIKE VEHICLES
Filed Dec. 26, 1957          2 Sheets-Sheet 1
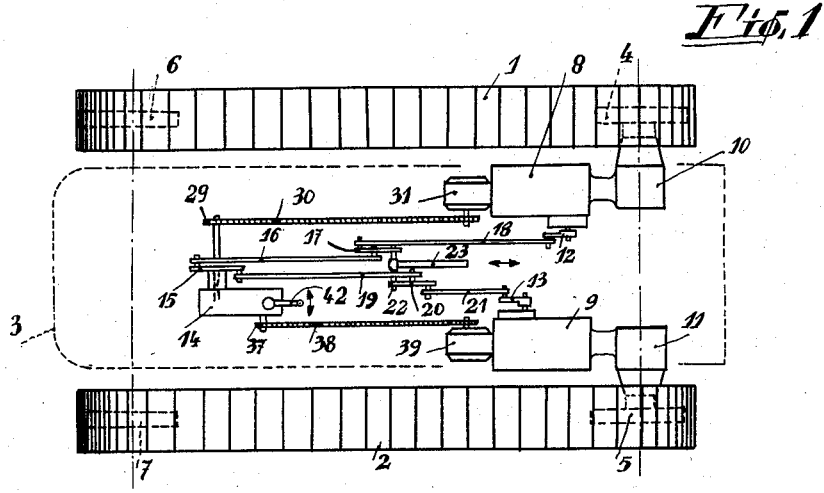
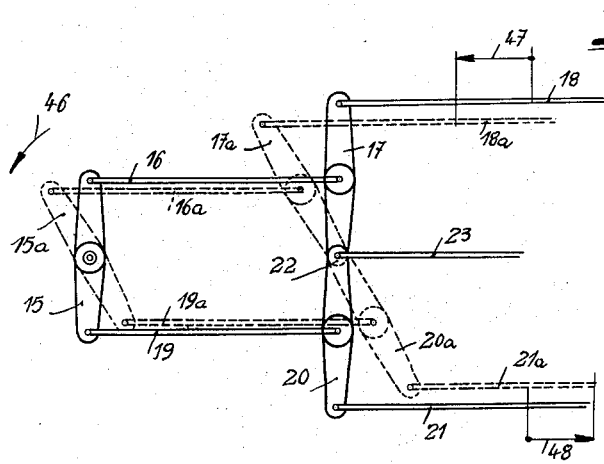
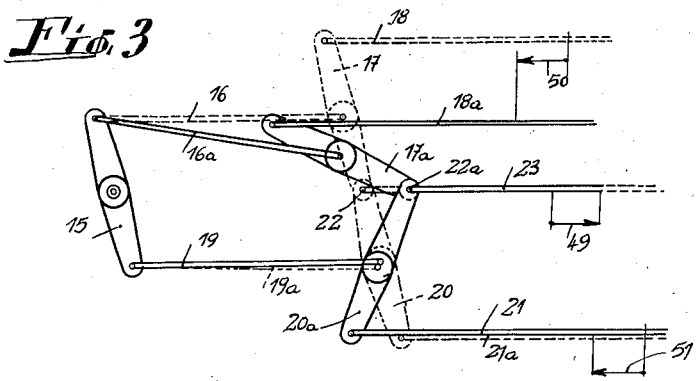

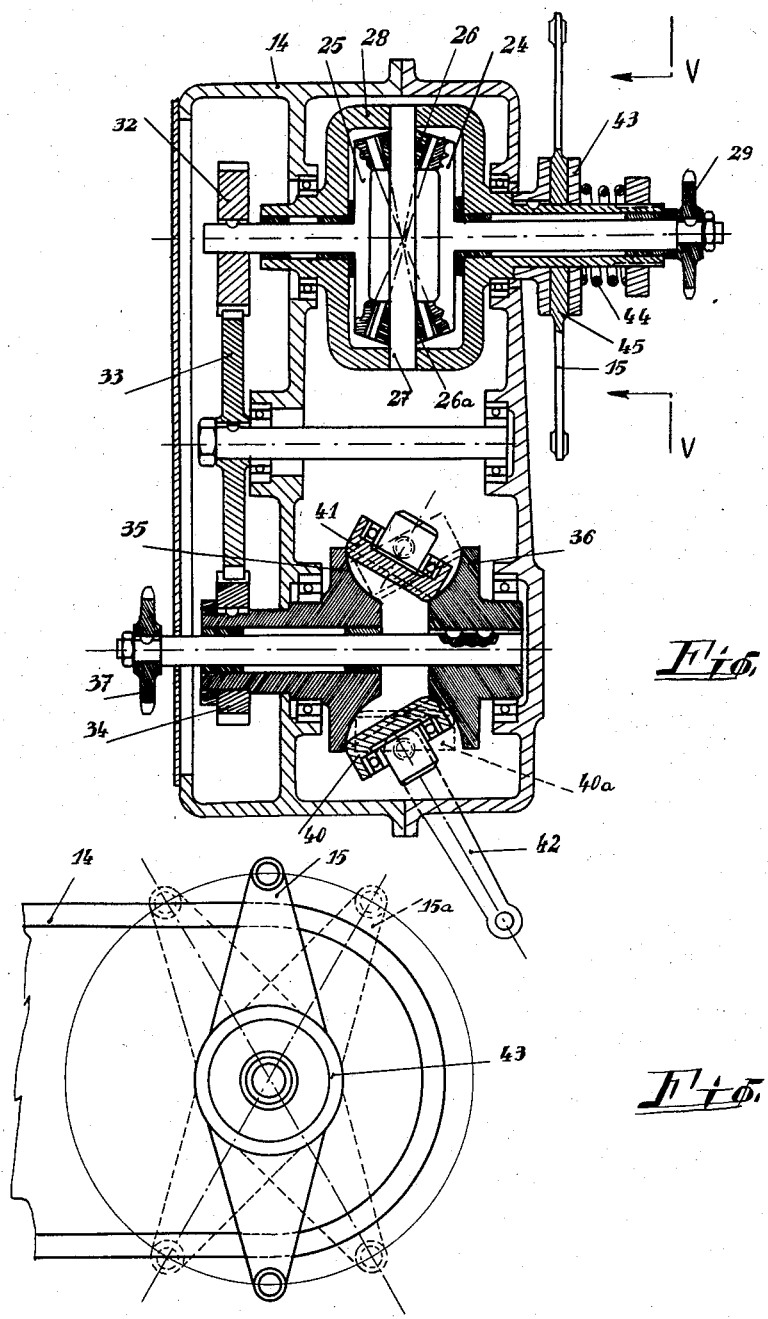

United States Patent Office 2,906,356
Patented Sept. 29, 1959

2,906,356

ARRANGEMENT FOR THE AUTOMATIC STEERING OF TRACTORS OR THE LIKE VEHICLES

Paul Pierre Richard, Villeurbanne, France

Application December 26, 1957, Serial No. 705,202

Claims priority, application France January 3, 1957

3 Claims. (Cl. 180—6.48)

This invention relates to the automatic steering of tractors and the like.

My invention has for its object the provision of means for keeping constantly and automatically a tractor on the path defined by the driver, said tractor being carried by caterpillars or by wheels of the type wherein the change in direction is obtained by imparting different speeds of rotation to the wheels or caterpillars located to either side of the vehicle.

The principle of my improved arrangement consists in providing for a constant comparison between the rotary speeds of the wheels or caterpillars on the left and right-hand sides respectively and, in those cases where such speeds differ from those required for following the path defined by the driver, the latter acts on the means controlling the speeds of said wheels or caterpillars on either side, so as to restore progression along the predetermined path.

The accompanying drawings illustrate by way of example a preferred embodiment of my invention. In said drawings:

Fig. 1 is a simplified plan view of a caterpillar tractor showing the manner of mounting the arrangement as a whole on a tractor.

Fig. 2 is, on an enlarged scale, a diagrammatic elevational view of the linkwork forming part of the arrangement illustrated in Fig. 1.

Fig. 3 is a view similar to Fig. 2 for another position of the levers forming said linkwork.

Fig. 4 is a sectional view of the means providing for automatic steering of the vehicle.

Fig. 5 is an end view of a part of said arrangement as seen in the direction V—V of Fig. 4.

In the different figures, 1 and 2 designate the two caterpillars of a tractor 3. Said two caterpillars are driven each at one end by a driving wheel or chain pulley 4 or 5 and they are carried at their other ends by two transmission wheels 6 and 7. The wheels 4 and 5 are driven into rotation by independent power units 8 and 9 through the agency of corresponding speed reducers 10 and 11.

The power units 8 and 9 may be of any suitable type, whether thermic, electric or hydraulic. They may be replaced by speed adjusting means driven by a common power unit or by separate power units the sole requirement for the drive consisting in that the units 8 and 9 may drive the chain pulleys of a caterpillar or the wheels of a wheeled tractor at a variable speed under the control of adjusting members. The adjusting members are illustrated diagrammatically at 12 and 13 as levers, the shifting of which provides for a modification in the speed of the corresponding power unit or speed-adjusting means at 8 or 9.

The levers 12 and 13 may act for instance on electric motors or generators, in the case of the transmission of electric power, or on the control means or regulators of injection pumps in the case of diesel engines being provided at 8 and 9 or again on the intake of gasoline engines or on the means controlling a hydraulic speed adjusting system, a hydraulic receiver or a hydraulic generator having a variable throughput.

The shiftings of the levers 12 and 13 are controlled by a control box or regulator 14 connected with each lever 12 and 13 through a linkage.

The member through which the control box operates the linkage is constituted by a double lever or rocker arm 15. Said rocker arm is connected furthermore at one end through a connecting rod 16 with a rocking lever 17 connected in its turn at one end with the controlling lever 12 through a connecting rod 18. The other end of the lever 15 is connected through a connecting rod 19 with a further rocking lever 20 which is connected in its turn with the controlling lever 13 through a connecting rod 21. The two rocking levers 17 and 20 are pivotally mounted on a common spindle 22 adapted to be shifted by a link 23 the position of which is controlled by the tractor driver.

Fig. 4 illustrates the mechanism of the control box 14. Said mechanism includes an epicycloidal gear the operation of which is similar to that of the differential gear of an automobile, said gear including two bevel sunwheels 24 and 25 and two planet pinions 26 and 26a fitted through a common shaft 27 on a planet-carrying casing 28.

The sunwheel 24 is driven into rotation by a pinion 29 which is driven itself at a speed proportional to that of the chain pulley 4; to this end, the pinion 29 may be connected, as illustrated in Fig. 1, through a chain 30 with a gear box 31 on the power unit or speed-modifying means 8 or again on the speed reducer 10 or on the actual chain pulley 4, this being provided in a manner such that the rotation of the sunwheel 24 may remain in an unvarying speed relationship with the rotation of the chain pulley 4 or with the tractor wheel, in the case of a wheeled tractor.

The sunwheel 25 is connected with the chain pulley or with the wheel on the opposite side of the tractor, with the interposition however of a speed adjusting member. To this end, the sunwheel 25 is connected through a gearing 32—33—34 with speed adjusting means of any suitable type. For instance, the gear wheel 34 is rigid with the plate 35 of a friction operated speed adjusting device, the other plate 36 of which is angularly rigid with a pinion 37 connected through a chain 38 with the gear box 39 on the second power unit or speed adjusting means shown at 5 in Fig. 1. The ratio between the angular speed of the pinion 37 and, consequently, of the plate 36 and the speed of the chain pulley 5 is therefore the same as the ratio between the speed of the pinion 29 and that of the chain pulley 4.

The plate 35 and 36 are connected through friction rollers 40 and 41 which are adapted to transmit the rotation of the plate 36 to the plate 35 with a speed ratio between said plates which varies with the slope given to said friction rollers. Said speeds may be equal if the rollers remain in the position shown at 40a. The slope of the rollers 40 and 41 and, consequently, the speed transformation ratio between the pinion 37 and the plate 35 and, therefore, between the pinion 37 and the sunwheel 25 is adjusted by a lever 42.

The slope given to the roller 41 is bound with that of the roller 40 through control means which are not illustrated. The arrangement is designed in a manner such that, for rotations in equal directions of the chain pulleys 4 and 5, the sunwheels 24 and 25 rotate in opposite directions and preferably in a manner such that their speeds of rotation may be equal and opposed when the speed adjusting means produce a transformation ratio equal to 1, as provided by the position 40a shown diagrammatically for the roller 40.

The planet carrier 28 is adapted to revolve inside the casing 14 and it drives as it rotates the lever 15 which is to act on the precedingly described linkworks. This drive is ensured with the interposition of a friction clutch formed by a plate 43 urged by a spring 44 against the hub 45 rigid with the lever 15.

The operation of the arrangement is as follows:

Assuming N1 is the speed of rotation of the chain pulley 4 or of the corresponding wheel on a wheeled tractor, N2 is the operative speed of the other chain pulley 5, while $n1$ and $n2$ are the corresponding speeds of rotation of the sunwheels 24 and 25 respectively, the following relationship binds N1 and $n1$ with each other:

$$n1 = kN1$$

$k$ being a constant coefficient defining the constant speed reducing ratio between the chain pulley 4 and the sunwheel 24.

Similarly:

$$n2 = xN2$$

$x$ being in this case the speed reducing ratio between the chain pulley 5 and the sunwheel 25, said ratio being variable by reason of the presence of the speed adjusting means inserted in the transmission of movement between the chain pulley 5 and the sunwheel 25. This is obvious since the speed reducing ratio varies with the position of the lever 42 controlling the slope assumed by the rollers 40 and 41. The sign — before $x$ shows that the rotations of the sunwheels 24 and 25 are of opposite directions for rotations of the chain pulleys 4 and 5 in the same direction.

In accordance with the well-known laws governing the operation of epicycloidal or differential gears, the rotary speed N of the planet—carrier 28 is bound with the speeds $n1$ and $n2$ of the sunwheels 24 and 25 by the relationship:

$$N1 = \frac{n1 + n2}{2}$$

or, taking into account the preceding relationship:

$$N = \frac{kN1 - xN2}{2} \quad (1)$$

When the condition $kN1 - xN2 = 0$ is satisfied, i.e. for $$\frac{N1}{N2} = \frac{x}{k}$$

this means that $N = 0$; in other words, the planet-carrier 28 remains stationary. The same is the case for the lever 15 rigid with the planet-carrier 28.

If N1 or N2 varies, the relationship $$\frac{N1}{N2} = \frac{x}{k}$$

being no longer satisfied, the speed N of the planet-carrier 28 is no longer zero; said planet-carrier moves then together with the lever 15 which, through the agency of the above-described connecting rods and rocking levers, acts on the levers 12 and 13. This increases the rotary speed of one of the chain pulleys and reduces the speed of the other chain pulley until the condition of equilibrium $$\frac{N1}{N2} = \frac{x}{k}$$

is again satisfied and the movement of the lever 15 stops.

If it is assumed, for instance, that the lever 15 occupies at the start the position 15 illustrated in Fig. 2, the condition $$\frac{N1}{N2} = \frac{x}{k}$$

being satisfied, and if it is also assumed that for any reason whatever, such as an increase of the resistance opposed to the caterpillar 2 or a slowing down of the power unit 9, the speed N2 decreases, it is apparent that in the relationship (1) the term $xN2$ decreases so that $$N = kN1 - N2$$

assumes a positive value different from zero. The lever 15 revolves at a speed N in the direction illustrated by the arrow 46. During this movement, it acts through the connecting rods 16 and 19 on the rocking levers 17 and 21 which rock round the spindle 22 and act in their turn on the connecting rods 18 and 21 which move in opposite directions and act on the levers 12 and 14 which adjust the speed of the power units or speed adjusting means 8 and 9. Consequently, the speed of the power unit 9 and therefore the speed N2 of the chain pulley 5 is increased, while the speed N1 of the chain pulley 4 decreases. The term $xN2$ of the relationship (1) increases, while the term $kN1$ decreases; the speed N of the planet-carrier decreases down to zero, as soon as the above-referred to condition $$\frac{N1}{N2} = \frac{x}{k}$$

is again satisfied; the lever 15 is again stationary in the position 15a it has now reached while the rocking levers 17 and 20 occupy positions 17a and 20a and the connecting rods 18 and 21 have moved in opposite directions by lengths defined by the vectors 47 and 48.

Thus, any modification in the speeds N1 and N2 of the chain pulleys destroys the relationship $$\frac{N1}{N2} = \frac{x}{k}$$

so as to angularly shift the levers 15 which acts on the control means defining the relative speeds of the power unit or speed adjusting means 8 and 9 until said relationship is restored.

When the driver operates through the lever 42 which controls the speed adjusting means to adjust the speed reducing ratio $x$ between the sunwheel 25 and the chain pulley 5, the said driver defines the value of $$\frac{N1}{N2}$$

and, consequently, the path followed by the tractor. Said ratio being defined, the controlling differential gear acts in a manner such that its value may be permanently retained whatever may be the hindrances met by the caterpillar or the wheels and whatever may be the conditions of operation of the power units. The steering is thus obtained through such an operation of the lever 42.

In particular, if $x = k$, the ratio $$\frac{N1}{N2}$$

is equal to 1 and the tractor runs along a rectilinear path and retains its rectilinear motion, whatever may be the circumstances, under the action of the controlling differential gear.

It is possible to insert in the controlling connecting rods straps to adjust their lengths, so that the pivotal movement of the lever 15 may act first on one of the speed adjusting means to produce an acceleration thereof, before the other power unit or speed adjusting means is slowed down or reversely. It is also possible to fit said connecting rods with springs and dash pots or damping arrangements so as to cut out any oscillating or hunting phenomena.

The speed adjusting means may be small-sized, the stresses transmitted by it for actuation of the lever 15 being reduced. It may be of a frictional, hydraulic, mechanical, electrical or any other suitable type providing a gradual or stepwise modification in speed with reversal thereof if required, which allows obtaining turns within a very reduced radius by causing the chain pulleys 4 and 5 to act or the tractor wheels to rotate in opposite directions provided however the power unit or speed adjusting means 8 and 9 are capable of rotating in both directions. This is the case, for instance, when one resorts to electric control sets wherein the speed may be adjusted or reversed through actuation of the energizing rheostats of the generators as in the case of the Ward-Leonard groups in which case the levers 12 and 13 control the energization of the generators feeding the independent motors driving the chain pulleys or the wheels.

It should be remarked that it is possible to cut out the speed adjusting means by connecting the two sunwheels directly with the corresponding chain pulleys in the manner described for the connection between the sunwheel 24 and the chain pulley 4 with a reversal of the direction of rotation for one of the sunwheels. The controlling differential gear would then form a stabilizer with reference to rectilinear travel and it should be disengaged to allow obtaining turns through any other means.

The friction clutch fitted between the planet-carrier 28 and the lever 15 has merely for its object to allow the planet-carrier to continue rotating when the lever 15 reaches the end of its stroke which is limited by stationary stops without it being possible to restore the desired speeds N1 and N2; this may happen whenever the correction to be executed is larger than the range of adjustment provided by the power unit or speed adjusting means 8 and 9. In this case, the speed correction is brought to its maximum without this being sufficient for constraining the tractor to follow the path required by the tractor driver.

Fig. 3 shows the operation of the speed controlling link 23. The latter may be shifted by the driver, so as to increase or to reduce simultaneously the speeds N1 and N2 of the chain pulleys or wheels and, consequently, to adjust the speed of progression of the tractor, while allowing the regulator 14 to act as precedingly on the speeds N1 and N2 so as to correct the path followed by the tractor.

In said Fig. 3, the reference numbers 17 and 20 designate the positions occupied by the rocking levers when their common pivotal axis lies at 22. When said pivotal axis 22 is shifted into a position 22a through a shifting of the connecting rod 23 by an amount illustrated by the vector 49, the rocking levers 17 and 20 enter the positions 18a and 21a and they are subjected to shifting in the precedingly defined directions in the manner illustrated by the vectors 50 and 51. Thus, thee speeds N1 and N2 are reduced simultaneously through the shiftings in the same direction of the levers 12 and 13. Said action does not prevent the independent operation of the lever 15 which acts so as to restore the progression over the path required by the driver and which is defined solely by the ratio provided by the speed adjusting means. The differential gear superposes its action on that of the speed controlling link 23 and restores progression along said path, even if the shiftings defined by the vectors 50 and 51 under the action of the link 23 are not equal or consistent with the path which has been thus defined.

The differential gear constituted by the sunwheels and planet-wheels 24, 25, 26, 26a may be replaced by any type of differential mechanism leading to the same result, i.e. a mechanism including a member which is stationary as long as two other members the speed of which is mathematically bound with the speeds of the propelling shafts corresponding to the running gears on either side of the tractor are in a predetermined relationship. Such a mechanism may be constituted by sprocket wheels, arrangements with differential screws and nuts, electric, hydraulic or the like means.

On the other hand, the speed adjusting means inserted in a single transmission between one chain pulley and the cooperating sunwheel may be replaced by double speed adjusting means, so that the speed relationship between the chain pulley 4 and the sunwheel 24 may also be variable. The operation of the system would not be modified thereby.

What I claim is:

1. In a tractor, the combination of driving and carrier members located to either side of the tractor, means for driving independently the carrier member on each side of the tractor, speed adjusting means for the means driving each carrier member, a differential gear including two input members operatively connected with the carrier member on the corresponding side of the tractor to rotate at a speed proportional to that of said carrier member and a third member controlled by the relative speed of the two first members of the differential gear and adapted to remain stationary whenever the carrier members rotate with reference to each other with a predetermined speed ratio, means whereby said third member upon modification of the relative speed of the carrier members with reference to said predetermined ratio and upon consequent modification of the relative speed of the two first members of the differential gear acts on the two speed adjusting means in opposite directions to restore said speed ratio to its predetermined value and means for adjusting the coefficient of proportionality between at least one of the two first mentioned members of the differential gear and the corresponding carrier member in accordance with the value selected for the predetermined speed ratio.

2. In a tractor, the combination of driving and carrier members located to either side of the tractor, independent means driving each carrier member, independent means for adjusting the speed of the carrier member on each side of the tractor, a differential gear including two input members and one output member, a linkwork operatively connecting the output member with the adjusting means for the carrier members on either side of the tractor to shift the speed of the latter in opposite directions, hand-operable means within reach of the tractor driver controlling the linkwork to produce a modification in the speed of progression of both carrier members simultaneously, means operatively connecting each of the carrier members with the corresponding input member and further adjusting means inserted between at least one carrier member and the cooperating input member to define the relative speed between the two carrier members for which the input members of the differential gear revolve in equal and opposite directions and the output member is consequently stationary and hand-operable means within reach of the tractor driver controlling the last-mentioned means.

3. In a tractor, the combination of driving and carrier members located to either side of the tractor, independent means driving each carrier member, independent means for adjusting the speed of the carrier member on each side of the tractor, a sun and planet gear, a linkwork operatively connecting the planet system of said gear with said adjusting means to shift the latter in opposite directions, means connecting operatively each sunwheel of said gear with the system including the carrier member and the driving means therefor on the corresponding side of the tractor, a lever within reach of the tractor driver controlling the linkwork to define the common speed of the carrier members on either side of the tractor, a friction drive providing a variable speed ratio inserted between at least one system including a carrier member and corresponding driving means and the cooperating sunwheel and means within reach of the tractor driver and controlling said friction drive.

References Cited in the file of this patent

UNITED STATES PATENTS

| | | |
|---|---|---|
| 2,660,861 | Schmitt | Dec. 1, 1953 |
| 2,730,182 | Sloane | Jan. 10, 1956 |
| 2,782,601 | Hamilton | Feb. 26, 1957 |